United States Patent [19]

Farrar et al.

[11] Patent Number: 4,895,687
[45] Date of Patent: Jan. 23, 1990

[54] PROCESS FOR CONVERTING DUSTY OR STICKY PARTICULATE MATERIALS

[75] Inventors: David Farrar; Peter Flesher, both of West Yorkshire, England

[73] Assignee: Allied Colloids Ltd., United Kingdom

[21] Appl. No.: 262,619

[22] Filed: Oct. 26, 1988

[30] Foreign Application Priority Data

Oct. 27, 1987 [GB] United Kingdom ............... 8725096

[51] Int. Cl.$^4$ ........................................... B29B 9/00
[52] U.S. Cl. .................................. 264/118; 252/88; 264/128; 264/140; 427/221
[58] Field of Search ............... 264/140, 36, 37, 118, 264/129, 128, 236, 347, 109; 75/2; 427/221; 252/88, 383, 384

[56] References Cited

U.S. PATENT DOCUMENTS

| | | | |
|---|---|---|---|
| 3,440,533 | 4/1969 | Earley | 324/74 |
| 3,707,191 | 12/1972 | Parker | 166/275 |
| 3,727,689 | 4/1973 | Clampitt | 166/283 |
| 3,795,276 | 3/1974 | Eilers et al. | 166/295 |
| 4,371,443 | 2/1983 | Keeney | 166/300 |
| 4,461,352 | 7/1984 | Falk | 166/295 |
| 4,684,549 | 8/1987 | Allen et al. | |

FOREIGN PATENT DOCUMENTS

| | | |
|---|---|---|
| 195550 | 9/1986 | European Pat. Off. . |
| 1311392 | 3/1973 | United Kingdom . |
| 2200133 | 7/1988 | United Kingdom . |

*Primary Examiner*—Hubert C. Lorin
*Attorney, Agent, or Firm*—Ostrolenk, Faber, Gerb & Soffen

[57] ABSTRACT

A particulate mass that can be dusty but is generally sticky, due to the presence of water, is coverted to an apparently dry, non-dusty granular material by polymerizing a polymerizable material within the mass and breaking the mass down to the desired granular form after the polymerization has gone sufficiently far that the mass is substantially non-sticky but before the polymerization is completed.

10 Claims, No Drawings

PROCESS FOR CONVERTING DUSTY OR STICKY PARTICULATE MATERIALS

This invention relates to processes of converting dusty or sticky particulate materials into a form that is more convenient for handling.

Although some particulate materials, for instance of a substantially regular and granular size, can be very convenient for handling, the handling of other particulate masses can be very inconvenient and in some instances it can require special safety precautions.

One problem that arises is that dusty particulate masses give a dusting problem that may necessitate special safety precautions. This arises when the particulate mass includes particles that are both dry and very small, for instance a few microns or less. An example is dry lime, in that normal air movements are liable to blow it and this is both wasteful and can be unacceptable.

Many particulate masses are sticky when wet. Examples are discussed in EP No. 195550. A particular problem arises with coal fines of the type that are frequently formed during the recovery and processing of coal. These fines may be recovered by flotation and/or flocculation and then separated by filtration to form a wet filter cake. This wet filter cake is very sticky and it is extremely difficult to handle it or to mix other materials with it.

It is known from, for instance, EP No. 195550 and GB No. 2,200,133 to convert sticky, wet particulate masses such as these to crumbly solids. In particular, the process involves mixing into the mass certain polymer particles that are water absorbent and water swellable but are water insoluble. The polymer absorbs water, without becoming sticky, and so takes water from between the particles in the mass and converts the mass to a crumbly solid.

The absorbent polymer particles are very effective at absorbing the free, interstitial water from the mass. However, in many instances the particles in the wet particulate mass carry a surface hydrophilic film, for instance due to adsorbed surfactant and/or flocculation that may remain from, for instance, flotation and/or flocculation steps. The absorbent polymer tends to be incapable of withdrawing all the water from this film and so surface water tends to remain on the particles, thereby preventing the mass becoming as crumbly as would be desired.

This problem is more acute with some particulate masses than with others and it would be desirable for there to be an entirely different way of converting an aqueous composition from a fluid or sticky state to a particulate friable state.

It is well known in water-shut-off process and in polymer grouting processes to introduce into the desired location an aqueous solution of a linear polymer and then to cross link it in that location so as to block the entire location. However this clearly is of no assistance in the problem of producing a friable mass from a sticky or dusty mass.

In GB No. 1,311,392 agglomerates of solid particulate material are made by treating the particulate material with a dialdehyde such as glyoxal and a polyacrylamide, in aqueous solution. The glyoxal causes cross linking of the polyacrylamide. The process is described as being useful for, for instance, processing soil to form stable aggregates that allow air to permeate through to the underlying soil, for the solidification of building land, for drilling purposes, and for the production of moulding shells. In order to give time for the solution of polymer and glyoxal to be spread on to the soil it is warned that the rate of gelling should not be too fast.

This process clearly is being described for the production of an agglomerated mass or moulding by applying the polymer to the particulate material while in the final desired shape, and then allowing the polymerisation to go to completion without disturbing the shape of the mass.

It is also well known to form various types of shaped articles by mixing particulate material with a binder, shaping the mix while the binder is uncured, and then curing the binder.

None of these techniques are suitable for solving the problems of making dusty or sticky particulate masses more readily handlable.

In the invention, a dusty or sticky particulate mass is converted into an apparently dry, substantially non-dusty, granular material by a process comprising distributing a polymerisable material in aqueous solution substantially uniformly throughout the particulate mass, causing polymerisation of the polymerisable material to proceed to a state at which the mass is substantially non-sticky, converting the mass to granular form and completing the polyermisation and, if necessary, breaking any aggregates of granules.

The particles are preferably insoluble in water. They can be organic but are usually inorganic.

The particulate mass can be a dry and dusty particulate mass such as lime or any other dry particulate material that potentially could cause dusting problems. Preferably however, the particulate mass is a wet sticky particulate mass that has a solid phase and that is sticky due to the presence of an aqueous phase. The water content is generally at least 15%. It can be sufficiently high, for instance between 50 and 75%, that the bulk composition is a fluid slurry, but it is then necessary to use a relatively large amount of polymeric material to render the compositon friable, and so it is preferred to dewater the composition, before adding the polymeric material, to a water content of below 50% and preferably below 40%. Often the water content is in the range 20 to 40%, preferably 25 to 35% by weight.

The solid phase preferably is coal fines, typically having a particle size below 2 mm, usually below 1 mm and often in the range 0.1 to 0.5 mm. Accordingly the aqueous composition preferably is a wet filter cake of coal fines, for instance as obtained by vacuum filtration by a disk, drum or other vaccum filter of a slurry of coal fines, often obtained by froth flotation. Other materials that can be present as sticky or fluid masses and that can be treated by the invention include economically important materials such as carbon black or metallurgical suspensions such as red mud or copper concentrates, and environmentally important materials such as radioactive or other toxic waste. The materials can be organic (e.g., sewage solids). The particles sizes are generally similar to those quoted above.

The polymerisable material must be distributed throughout the particulate mass as an aqueous solution in order that it makes sufficient contact points with the particulate component of the mass such that it can provide adequate bonding within the mass.

The polymerisable material can be introduced in the form of dry particles, either as a powder or as a dispersion in a non-aqueous liquid, if sufficient water is introduced with it or if the particulate mass already contains sufficient water to permit dissolution of the particles. The introduction must be accompanied by sufficient stirring both to achieve the formation of an aqueous solution of the dry polymer and to achieve substantially uniform distribution of the solution throughout the mass.

Generally however the polymerisable material is introduced in dissolved form. It can be introduced as an emulsion, for instance as a dispersion of aqueous polymer in non-aqueous liquid, but generally it is introduced as a bulk solution of polymer. Often the bulk solution or other polymer is applied by spraying on to the mass and then sufficient stirring must be provided to distribute the polymer solution throughout the aqueous composition.

The polymerisable material must be material that can be polymerised within the mass to give the desired bonding effect. Bonding could be achieved by the use of a water soluble monomer or monomer blend or very low molecular weight prepolymer that polymerises primarily by chain extension. Preferably however the prepolymer is a material that is of moderate to high molecular weight. The polymerisation may be by chain extension but is preferably wholly or mainly by cross linking. Thus the polymerisable material preferably comprises a medium to high molecular weight polymer that either incorporates self-crosslinkable groups or that is blended with a cross linking agent. The polymer preferably has a molecular weight in the range of at least 100,000, typically having intrinsic viscosity of at least 0.5 dl/g, e.g., 0.5 to 3 dl/g. It is usually at least 1 dl/g.

It is preferably a polymer of a water-soluble ethylenically unsaturated monomer or monomer blend that is capable of being cross-linked in solution. The polymer may be anionic, non-ionic or cationic. The monomers are generally acrylic but can be allylic.

Suitable anionic monomers are carboxylic or sulphonic monomers such as (meth) acrylic acid, allyl sulphonate and 2-acrylamido methyl propane sulphonic acid. Such monomers are generally present as a water-soluble salt, usually a sodium salt.

Suitable non-ionic monomers are (meth) acrylamide.

Suitable cationic monomers are dialkyl aminoalkyl (meth) -acrylate or -acrylamide as free base, acid salt or, preferably, quaternary salt.

The polymers must contain groups that are capable of participating in a subsequent cross-linking or other polymerisation reaction. Preferred groups for this purpose are (meth) acrylamide and (meth) acrylic acid or other carboxylic acid monomer groups. Accordingly preferred polymers for use in the invention are formed from monomers that include acrylamide and/or acrylic acid. In particular the preferred polymers are generally formed from 50 to 100%, often 80 to 100% by weight acrylamide and 0 to 50%, often 0 to 20%, by weight acrylic acid.

The polymer can contain groups that will permit internal cross linking between adjacent polymer chains. For instance the polymer may include methylol acrylamide groups in which event polymerisation can be initiated merely by the addition of alkali. It is, however, generally preferred for the polymer to include cross-linkable groups and for the polymerisable material to include an external cross linking agent that reacts with these groups to cause cross-linking.

Any of the cross-linking mechanism known for polymer grouting and water shut-off can be used, and involve reaction between the polymer and the cross-linking agent (often promoted by an activator). Examples of known processes of this type are in U.S. Pat. Nos. 4,461,352, 4,371,443, 3,795,276, 3,707,191, 3,440,533 and 3,727,689.

In one such method, a polymer containing acrylamide groups is cross linked by reacting acrylamide polymer with an aldehyde cross-linking agent and an alkaline catalyst. The aldehyde cross-linking agent can be formaldehyde or acetaldehyde or other low molecular weight aldehyde but is preferably a dialdehyde, especially glyoxal. It can be mixed into the aqueous composition before, after, or at the same time as mixing the polymeric material into the composition. Unless the composition is already alkaline, alkaline catalyst such as sodium hydroxide or sodium carbonate that must also be mixed into the composition in order to initiate cross-linking.

In another method, the polymer contains carboxylic acid groups and cross-linking can conveniently be by reaction with a polyvalent metal, generally a di- or tri-valent metal such as aluminium, chromium, manganese or iron. Conveniently this can be provided by providing a mixture of the polymer and a higher valency metal compound and then reducing the higher valency metal compound to a di or tri valent metal compound that acts as a cross linking agent. Many such systems are known in, for instance, water shut-off processes and typically a hexavalent chromium compound can be included before, after or at the same time as the polymeric material and can be reduced in situ by reducing agent to trivalent chromium.

After distributing the aqueous solution of polymerisable material throughout the particulate mass, polymerisation of the polymerisable material is initiated, for instance either by chain extension or, more usually, by cross linking. The cross linking reaction may be spontaneous, for instance due to activator that is already in the particulate mass, such that cross linking occurs spontaneously upon distributing the polymerisable material substantially uniformly throughout the mass. Generally however the polymerisable material, including any external cross linking agent, is distributed substantially uniformly throughout the mass and an activator for the cross linking reaction is then added so as to cause the polymerisation. For instance, in the cross linking system discussed above, the activator may be an alkali (for the acrylamide-aldehyde reaction) or a reducing agent (for the carboxylic-metal reaction).

If the initial mass is dusty, the addition of the aqueous solution and the initiation of the polymerisation will cause it to become sticky. If the mass is originally sticky, then the addition of the solution of polymerisable material and the initiation of the polymerisation will not reduce stickiness, and may make it worse.

In each instance, in the invention the polymerisation is allowed to continue to a state at which the mass has become substantially non-sticky even though polymerisation has not completed. The mass is converted to granular form in this stage and polymerisation is then completed. The granule size typically is in the range 0.5 to 5 mm but it can be larger.

In the absence of the step of converting the mass to granular form while it is substantially non-sticky but only partially polymerised, a bulk rigid gel would have been obtained and this could only be converted to granular form by comminuting steps that require energy and would, in any event, only be appropriate for certain types of gel structure. In the invention the comminution of the mass to granular form is performed while the gel structure is relatively weak, so that low amounts of energy are required to achieve granulation. However the gel structure, and the degree of polymerisation, must be sufficiently advanced that the mass is sufficiently non-sticky that the granules that are formed do not bond into a solid lump, since this would then necessitate comminution after the polymerisation was complete. However some minor degree of stickiness can be tolerated since if weak aggregation of granules occurs then it is easy to break these weak aggregates after polymerisation has completed, for instance merely by stirring.

Although part at least of the conversion of the mass to granular form must be conducted after the mass has become substantially non-sticky, some of the conversion is usually conducted before, i.e., while it is sticky. For instance the mass may be extruded into granules as it polymerises, provided that the mass is substantially non-sticky at the time the extruded granules first contact one another.

The preferred way of converting the mass to granular form is by stirring or otherwise applying shear to the mass and some at least of the stirring must be conducted at the stage when the mass is substantially non-sticky, but before polymerisation has been completed. Often it is also stirred while sticky but after polymerisation has started. The stirring can be intermittent but is usually substantially continuous. It can continue until polymerisation is substantially complete.

If stirring is terminated too soon the particles will flow together, whilst if it is started too late excessive energy will be needed to convert the gel to particles. It is generally preferred to stir the mix from about the time significant polymerisation starts to occur until the particles become moderately non-tacky. If it is found that the particles tend to stick to each other then further shear can be applied to break them apart again.

Stirring can conveniently be applied by a screw or other mixer, for instance the same mixer as is used to add the ingredient or ingredients that initiate cross-linking.

The use of polymers having relatively low molecular weight, for instance intrinsic viscosity below 2 or 3dl/g or molecular weight less than about 1 million, can be particularly advantageous in the invention since it facilitates the formation of a gel structure that is sufficiently strong to bond the particles within the granules but sufficiently weak to facilitate conversion of the polymerising mass to granular form.

The optimum amount of polymerisable material will depend upon the characteristics of the starting mass and the nature, especially the molecular weight, of the polymerisable material. If it is too low than the mass will never become sufficiently non-sticky and if it is too high the step of converting the mass to granular form will require excessive amounts of energy.

The amount of cross-linkable polymeric material that is used is generally at least 0.1 and preferably 0.3% by weight based on the weight of aqueous composition. It is usually below 5% and preferably below 2.5% by weight. Best results are generally obtained at about 0.5 to 2%. The amount of polymeric material based on the water in the compositon is generally at least 0.5, preferably at least 1% by weight but is usually below 15%, preferably below 8% by weight. Best results are generally obtained with about 1.5 to 6% by weight polymer based on water.

If the molecular weight and concentration of the polymer is such that the solution of it that is added to the sticky mass is so viscous that it is difficult to mix into the aqueous composition, it is preferred to introduce the polymer as a reverse phase dispersion of aqueous polymer in non-aqueous liquid.

The size and shape of the granules of the granular material will be affected by, for instance, the degree of stirring or other shear that is applied during the process but generally most of the granules will have a size in the range 100 to 2,000, often 100 to 1,000 μm. These granules will appear dry since the polymer gel that is formed during the process will trap the water within the gel and yet will appear dry, in the sense that it is non-sticky to the touch. For instance the final material may have quite a high water content, for instance in the range 15 to 50%, often around 25 to 35%, by weight of the total granular material but will, nevertheless, feel dry because the water will be absorbed into the polymeric gel structure of the granules.

The following are examples:

EXAMPLE 1

Polyacrylamide having intrinsic viscosity of about 1 dl/g was provided as a aqueous solution and was mixed with various amounts of glyoxal, together with sufficient acid to hold the pH at about 4 to 4.5 so as to prevent premature gelation.

125 g of wet coal filter cake (having a water content of around 30% and a particle size below 1 mm) was weighed into the bowl of a batch mixer and the required amount of polymer-glyoxal solution was added and mixed for about 30 seconds. 2 mls of 10% sodium hydroxide solution was added and the mixture was stirred for 3 minutes.

In one series of tests the molar ratio acrylamide:glyoxal was 1:2 in which event the amount of polymer in the solution was 14.2% and the total amount of polymer and cross-linking agent in the solution was 25.8%. At polymer doses of 0.5 or 1 and 2% (based on the wet filter cake) the product was a crumbly particulate mass that appeared dry even though it still contained all the water that was initially present in the wet filter cake. When the amount of polymer was 0.25% the product tended to be sticky.

When the molar ratio acrylamide:glyoxal was 1:1 the polymer concentration in the solution was 16.6% and again it was the polymer doses of 0.5, 1 and 2% based on the wet cake that gave a crumbly product. When the molar ratio acrylamide:glyoxal was 5:1 the product remained sticky.

The samples were compressed and their green strength measured after one hour. The lowest values tended to be obtained with the highest polymer amounts and the best results were obtained with 2% polymer based on the wet cake when using a 1:1 molar ratio with glyoxal.

EXAMPLE 2

The process of example 1 was repeated using equimolar amounts of acrylamide and glyoxal and using sodium carbonate as activator instead of sodium hydroxide. Very crumbly products were obtained at amounts of sodium carbonate ranging between 0.125 and 2% by weight based on the wet cake.

EXAMPLE 3

The process of example 1 was repeated except that the initial polymer was a 95:5 acrylamide-acrylic acid and the cross-linking system was sodium dichromate-sodium metabisulphite instead of glyoxal-sodium hydroxide. The coal filter cake, polymer solution in an amount of 1% polymer based on wet cake, 2.24 ml of 20% aqueous sodium dichromate and 2.76 ml of 20% aqueous sodium metabisulphite were combined together and mixed for 10 minutes, at which state the mix was crumbly. The crumbly mix was allowed to cure for 2 hours and was then remixed to break the weak coherent structure that had formed on standing. The product felt extremely dry and crumbly even though it contained all the initial water of the composition. It had extremely low green strength after compression.

We claim:

1. A process of converting a dusty or sticky particulate mass into an apparently dry, substantially non-dusty, granular material, the process comprising distributing a polymerisable material in aqueous solution substantially uniformly throughout the particulate mass, causing polymerisation of the polymerisable material to proceed to a stage at which the mass is substantially non-sticky, converting the mass to granular form while in this state and completing the polymerisation and, optionally, breaking any aggregates of granules after polymerization completion.

2. A process according to claim 1 in which an apparently dry, substantially non-dusting, granular material is formed from a sticky particulate mass consisting essentially of particles and 15 to 50% by weight water.

3. A process according to claim 1 in which an apparently dry, substantially non-dusting, granular material is formed from a sticky particulate mass which is a wet filter cake of coal fines.

4. A process according to claim 1 in which the polymerisable material comprises a polymer of a water soluble, ethylenically unsaturated, monomer or monomer blend.

5. A process according to claim 1 in which the polymerisable material comprises a cross-linkable polymer of water soluble, ethylenically unsaturated, monomer or monomer blend, together with an external cross linking agent for cross linking cross-likable groups within the polymer.

6. A process according to claim 5 in which the cross-linkable groups are (meth) acylamide and the external cross linking agnet is an aldehyde.

7. A process according to claim 5 in which the cross-linkable groups are acyrylamide and the cross-linking agent is glyoxal.

8. A process according to claim 5 in which the cross-linkable groups are carboxylic acid groups and the cross-linking agent is a polyvalent metal compounds.

9. A process according to claim 1 in which the mass is converted to granular form by stirring the mass while substantially non-sticky and before polymerisation is complete.

10. A process according to claim 9 in which the mass is also stirred while the mass is sticky but after polymerisation has started.

* * * * *